United States Patent
Muegge et al.

(10) Patent No.: US 12,467,601 B2
(45) Date of Patent: Nov. 11, 2025

(54) SURFACE LIGHT GUIDE FOR A LAMP OF A MOTOR VEHICLE AND LAMP FOR A MOTOR VEHICLE

(71) Applicant: HELLA GMBH & CO. KGAA, Lippstadt (DE)

(72) Inventors: Martin Muegge, Geseke (DE); Alfons Michaelis, Borchen (DE); Christian Smarslik, Muenster (DE); Dietmar Haut, Lippstadt (DE); Stefan Brueckner, Renningen (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 13 days.

(21) Appl. No.: 18/294,165

(22) PCT Filed: Aug. 2, 2022

(86) PCT No.: PCT/EP2022/071686
§ 371 (c)(1),
(2) Date: Feb. 1, 2024

(87) PCT Pub. No.: WO2023/012158
PCT Pub. Date: Feb. 9, 2023

(65) Prior Publication Data
US 2025/0093009 A1     Mar. 20, 2025

(30) Foreign Application Priority Data
Aug. 2, 2021 (DE) .................... 10 2021 120 001.6

(51) Int. Cl.
*F21S 43/245* (2018.01)
*F21S 43/241* (2018.01)

(52) U.S. Cl.
CPC .......... *F21S 43/245* (2018.01); *F21S 43/241* (2018.01)

(58) Field of Classification Search
CPC ....... F21S 43/245; F21S 43/241; F21S 43/239
See application file for complete search history.

(56) References Cited

U.S. PATENT DOCUMENTS

| 2004/0136203 | A1 | 7/2004 | Gasquet |
| 2017/0276315 | A1 | 9/2017 | Kawabata |

(Continued)

FOREIGN PATENT DOCUMENTS

| CN | 110195848 A | 9/2019 |
| CN | 212029391 U | 11/2020 |

(Continued)

OTHER PUBLICATIONS

Innovation Q+ NPL Search (Year: 2024).*

Primary Examiner — Anabel Ton
(74) Attorney, Agent, or Firm — Norman B. Thot

(57) ABSTRACT

A surface light guide for a light of a motor vehicle. The surface light guide includes a light coupling section which is directly or indirectly connected to a light decoupling section. The light decoupling section includes a first flat side, a second flat side which is arranged opposite to the first flat side, a light decoupling surface which is arranged on the first flat side, and a decoupling structure which is arranged on the first flat side or on the second flat side. The decoupling structure has a plurality of individual and spaced-apart light decoupling elements. The decoupling structure deflects light rays which are coupled in by an illuminant so that deflected light rays are emitted through the light decoupling surface. The light coupling section couples in light rays from the illuminant and mixes the coupled-in light rays.

18 Claims, 7 Drawing Sheets

(56) References Cited

U.S. PATENT DOCUMENTS

2020/0166193 A1    5/2020  Yamamoto et al.
2022/0299187 A1    9/2022  Mügge et al.

FOREIGN PATENT DOCUMENTS

| | | | |
|---|---|---|---|
| CN | 119333763 A * | 1/2025 | ........... B60Q 1/0058 |
| DE | 10 2012 111 313 A1 | 5/2014 | |
| DE | 10 2019 119 638 A1 | 1/2021 | |
| DE | 10 2019 008 837 A1 | 6/2021 | |
| DE | 10 2019 133 693 A1 | 6/2021 | |
| DE | 102013100557 B4 * | 7/2022 | .............. F21S 43/14 |
| EP | 3 210 827 A1 | 8/2017 | |
| EP | 3 228 924 A1 | 10/2017 | |
| EP | 3 657 069 A1 | 5/2020 | |
| FR | 3 019 263 A1 | 10/2015 | |
| FR | 3 026 816 A1 | 4/2016 | |
| JP | 2010-21002 A | 1/2010 | |

* cited by examiner

SURFACE LIGHT GUIDE FOR A LAMP OF A MOTOR VEHICLE AND LAMP FOR A MOTOR VEHICLE

CROSS REFERENCE TO PRIOR APPLICATIONS

This application is a U.S. National Phase application under 35 U.S.C. § 371 of International Application No. PCT/EP2022/071686, filed on Aug. 2, 2022 and which claims benefit to German Patent Application No. 10 2021 120 001.6, filed on Aug. 2, 2021. The International Application was published in German on Feb. 9, 2023 as WO 2023/012158 A1 under PCT Article 21(2).

FIELD

The present invention relates to a surface light guide for a light of a motor vehicle, comprising a light decoupling section which has a light decoupling surface provided on a first flat side and a decoupling structure on the first flat side or on a second flat side opposite the first flat side, wherein the decoupling structure is configured so that light rays coupled in by a light source are deflected in the light decoupling section so that the deflected light rays are emitted through the light decoupling surface in interaction with the decoupling structure. The present invention also relates to a light for a motor vehicle.

BACKGROUND

A motor vehicle usually comprises a plurality of lights. The lights are in particular used to draw the attention of other road users to the presence of the motor vehicle and the behavior thereof. Lights in the front area of the motor vehicle are, for example, used to generate a daytime running light, a direction indicator or a position light. Lights located in the rear area of the motor vehicle are in used particular as brake lights, taillights, back-up lights or indicators. Lights can also be provided in the vehicle interior to illuminate certain areas of the vehicle interior and thus make it easier for a vehicle occupant to find their way around the vehicle interior, in particular in the dark.

Such lights define, among other things, the look of the vehicle, wherein LED technology in particular offers a wide range of possibilities for influencing the look of the vehicle. A wide variety of illuminated surfaces can, for example, be created using many small LED light sources in conjunction with the selected optical system. The disadvantages thereof are that the illuminated surfaces inevitably comprise many small luminous points when illuminated due to the individual light sources and that the illuminated surfaces are not illuminated homogeneously. So-called OLED technology can also be used, wherein the illuminant does not illuminate the surface to be illuminated as small dots like an LED illuminant, but instead illuminates the surface homogeneously over a wide area. The disadvantage of OLED technology compared to LED technology is that the manufacturing costs of OLED technology are relatively high due to its relatively complex production process. OLED light sources are also more sensitive than LED light sources with regard to outdoor temperatures, UV exposure, and mechanical stress, such as vibrations or impacts. This makes the use of OLED technology in motor vehicles relatively expensive.

Another option for homogeneously illuminating a surface is to combine the light source with a surface light guide. The surface light guide is here, for example, made of a special plastic with integrated nanoparticles for light deflection, wherein the surface light guide lights up homogeneously when light rays are coupled in by the light source, in particular an LED light source. The disadvantage thereof is that the photometric efficiency is relatively low and that the manufacture of the surface light guide is relatively expensive due to the special material having the nanoparticles.

The surface light guide can comprise a decoupling structure as an alternative to the nanoparticles. Such a surface light guide is described in EP 3 210 827 A1. The surface light guide there comprises a first flat side, which forms a light decoupling surface, and a second flat side opposite the first flat side, which comprises the decoupling structure. A light source is arranged on one end face of the surface light guide, wherein the light rays coupled in by the light source are coupled into the end face of the surface light guide and deflected towards the light decoupling surface by the decoupling structure. The decoupling structure is configured in a sawtooth shape. A disadvantage of such a surface light guide and the sawtooth-like decoupling structure is that a homogeneous illumination of the surface light guide is only possible to a limited extent or cannot be provided, in particular in the case of a relatively long design of the surface light guide.

SUMMARY

An aspect of the present invention is to provide a surface light guide for a light of a motor vehicle having a high photometric efficiency and which provides a homogeneous illumination.

In an embodiment, the present invention provides a surface light guide for a light of a motor vehicle. The surface light guide includes a light coupling section which is directly or indirectly connected to a light decoupling section. The light decoupling section comprises a first flat side, a second flat side which is arranged opposite to the first flat side, a light decoupling surface which is arranged on the first flat side, and a decoupling structure which is arranged on the first flat side or on the second flat side. The decoupling structure comprises a plurality of individual and spaced-apart light decoupling elements. The decoupling structure is configured so that light rays which are coupled in by an illuminant are deflected in the light decoupling section so that deflected light rays are emitted through the light decoupling surface. The light coupling section is configured to couple in light rays from the illuminant and to mix the coupled-in light rays.

BRIEF DESCRIPTION OF THE DRAWINGS

The present invention is described in greater detail below on the basis of embodiments and of the drawings in which.

DETAILED DESCRIPTION

Figure 2:
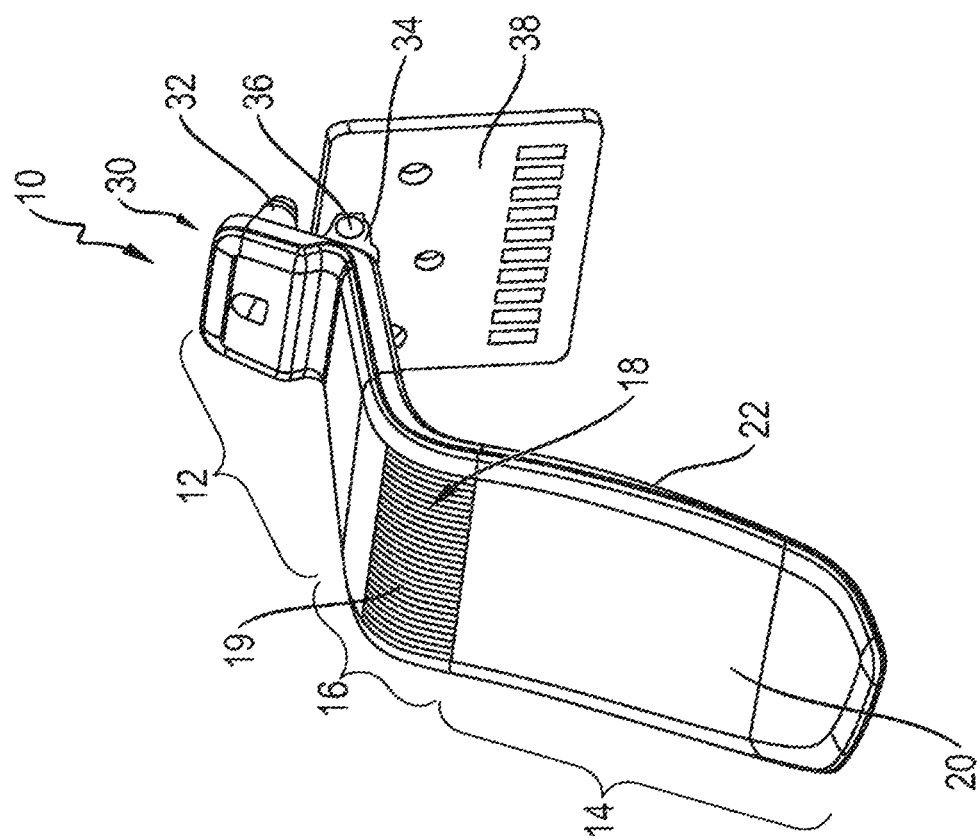
FIG. 2 shows the surface light guide in perspective front view.

Because the decoupling structure comprises a plurality of single and spaced-apart light decoupling elements, and a light coupling section is provided for coupling in light rays from a light source and for mixing the coupled-in light rays, wherein the light coupling section is directly or indirectly connected to the light decoupling section, a high photometric efficiency and a homogeneous illumination, i.e., luminance distribution, can be provided.

The light coupling section creates a lead-in area for the coupled light rays in which the light rays coupled in by the illuminant or illuminants are first mixed. This results in a homogeneous generation of scattered light in the adjoining light decoupling section of the surface light guide and thus a homogeneous illumination both in the longitudinal direction and in the width direction even at different viewing angles.

The light coupling section comprises a coupling surface on which a light coupling optic is arranged. The light coupling optics can, for example, comprise a linear lens for one or more light sources, in particular LEDs. The linear lens collects the light from each LED over a relatively large angular range along the width of the surface light guide. With a linear lens, several LEDs can be positioned very close to each other in a simple manner so that the maximum possible number of LEDs can be provided for each width of the coupling surface, thereby achieving a homogeneous illumination and a relatively high luminous intensity. The light coupling optic can, for example, comprise a light deflection structure at the upper and/or lower edge through which additional light rays are captured and coupled into the light coupling section to thereby increase the photometric efficiency.

Due to its simple shape, a linear lens can also be co-manufactured in a simple manner in the manufacturing process of the surface light guide, i.e., by an injection molding process. The linear lens can be co-manufactured in the manufacturing process of the surface light guide without sliders or other additional elements. The mold costs for manufacturing the surface light guide are therefore relatively low.

Side-emitter LEDs can be used as illuminants, wherein a printed circuit is arranged horizontally, i.e., in the coupling direction of the illuminant, to accommodate the LED and to supply it with an electrical current. The light source is alternatively a so-called top LED, wherein the circuit board is arranged vertically to the coupling direction.

The decoupling structure comprises several light decoupling elements which are in particular spaced apart in two spatial directions and which are arranged so that flat areas remain between the individual light decoupling elements. The flat areas are used to transmit the light rays within the light decoupling section. The light rays are transmitted by reflecting the light rays that reach the flat surfaces. Light rays are thereby reliably forwarded in the longitudinal direction and in the width direction of the light decoupling section, thereby achieving a homogeneous illumination of the light decoupling surface, in particular sufficient illumination at the end of the light decoupling section facing away from the light coupling section. The distance between the light decoupling elements is important for the appearance of the surface light guide and for the photometric efficiency.

The smaller the flat surfaces or flat areas between the light decoupling elements, the more light can be deflected and utilized, wherein the homogeneity of the illumination of the surface light guide increases with the size of the flat surfaces. The flat surfaces between the light decoupling elements can always have the same dimensions, both in the longitudinal and in the width direction, or change from a larger dimension to a smaller dimension for further improvement in the direction of light transmission through the light guide.

The appearance of the surface light guide changes with the viewing distance due to such a surface light guide with such a decoupling structure. Because the light decoupling elements are configured to be relatively small, an observer can see the individual light points of the light decoupling elements from close up. If the observer increases his/her viewing distance, the observer can no longer resolve the individual small light points of the light decoupling elements and much rather observes a complete, evenly illuminated surface.

The light decoupling elements can, for example, be arranged in a grid pattern. The light decoupling elements can, for example, be arranged in a horizontal and vertical grid, wherein no light decoupling elements are arranged at widenings or narrowings at the edge areas of the surface light guide. The light decoupling elements can alternatively be arranged in rows and distributed evenly in each row according to the width of the light guide. The surface light guide can thereby be evenly equipped with light decoupling elements in its light decoupling section, i.e., also at the edge areas, which creates a uniform appearance of the light decoupling section. A chessboard-like distribution of the light decoupling elements is also, for example, possible.

In an embodiment of the present invention, the light decoupling elements can, for example, comprise a maximum length of 1 mm; the light decoupling elements can therefore be referred to as micro-optics. In an embodiment of the present invention, the light decoupling elements can, for example, comprise a length of 0.3 to 0.6 mm. A uniform illumination of the light decoupling surface can be achieved by a large number of relatively small light decoupling elements so that the light decoupling section is perceived by an observer as a luminous surface.

Each light decoupling element can, for example, comprise several planar surfaces forming a pocket. Such light decoupling elements can easily be produced by milling a corresponding contour into an injection mold and thereby co-molding the light decoupling elements during the injection molding process to produce the surface light guide.

The light decoupling elements can alternatively comprise a concave or convex surface.

In an embodiment of the present invention, the light decoupling section can, for example, comprise at least a first section and a second section, wherein the first section comprises a plurality of first light decoupling elements and the second section comprises a plurality of second light decoupling elements that differ from the first light decoupling elements. In the course of the surface light guide, the light decoupling elements are adapted line by line to the geometry of the surface light guide, i.e., to the curvature and the inner light path, wherein the shape of the light decoupling elements changes permanently over the path of the surface light guide. A homogeneous light extraction can thereby be achieved.

The light decoupling section can, for example, be arranged at an angle to the light coupling section, wherein a deflection section is arranged between the light decoupling section and the light coupling section. In other words, the surface light guide is configured in a tongue-like or spoon-like manner. The surface light guide can thereby be easily attached to a base body via the light coupling section and the light rays can be coupled in, wherein the attachment and the light coupling take place via a substantially vertical plane. The light decoupling takes place via the light decoupling section, wherein the shape of the light decoupling section, which is usually visible in the final mounted state of the surface light guide, can be configured as desired and adapted to a desired styling of the component or the signaling function. The light decoupling section can, for example, comprise a curved shape. This creates a high design potential for different appearances or desired designs for a light. The light coupling section is usually arranged in a non-visible area of a light.

The deflecting section can, for example, have a light guiding structure on at least one of the two flat sides, wherein the light guiding structure comprises several protrusions extending in the longitudinal direction. In other words, the light guiding structure is configured in a corrugated manner. The corrugated light guiding structure of the deflection section is configured as small micro-optics in the form of micro-strip optics, for example, with a cylindrical cross-section, with a pitch of, for example, ≤1 mm, for example, 0.5 mm.

The light coupling section creates a lead-in area of the surface light guide for the coupled light rays in order to create an initial light mixing, in particular with several illuminants. The corrugated light guide structure in the deflection section achieves a further light mixing or a light ray deflection, resulting in a uniform scattered light generation in the subsequent light decoupling section and thus a homogeneous illumination even at different viewing angles.

In an embodiment of the present invention, the light decoupling section can, for example, comprise a wall thickness that reduces from a side facing the light coupling section to the free end. The surface light guide should be configured as flat or as thin as possible in order to provide a filigree appearance, in particular an OLED-like appearance. A surface light guide for coupling the light rays must comprise a certain minimum wall thickness, in particular a wall thickness in the range of 3 to 4 mm, in order to couple the light rays of the illuminant with a relatively high degree of efficiency. A sufficient wall thickness is also required for the production of the surface light guide, in particular via a plastic injection molding process and in particular for the sprue. By reducing the wall thickness of the light decoupling section, a thinner outlet of the visible light decoupling section is created while at the same time providing a required wall thickness for the light coupling and the injection molding process. By reducing the wall thickness, as much coupled-in light as possible can be coupled out through the light decoupling surface, wherein the reduction in wall thickness reduces the amount of light coupled out at the end face of the light decoupling section. This increases the efficiency of the surface light guide or a system with the surface light guide.

A fastening device for attaching the surface light guide to a support structure can, for example, be provided on a side of the light coupling section facing away from the light decoupling section. This allows the surface light guide to be attached to the support structure easily, reliably and in a non-visible area in the final assembled state of the surface light guide. The surface light guide can be attached to the support structure in a form-fit, force-fit and/or material-fit manner.

A surface light guide of this type provides a high photometric efficiency and a homogeneous illumination, i.e., a luminance distribution.

The present invention further provides a light for a motor vehicle which comprises a support structure, at least one surface light guide as described above, and at least one illuminant, wherein the surface light guide is attached to the support structure, and wherein light rays can be coupled into the surface light guide by illuminants. Reference is made to the above with regard to advantages.

Several surface light guides can, for example, be provided, which are arranged next to each other. In an embodiment, the edge areas of two neighboring surface light guides can, for example, overlap. The multiple surface light guides can also be arranged next to each other without overlapping. The light is in particular a combination rear light or a headlight, wherein several surface light guides can, for example, be arranged next to each other to provide a signaling function. The surface light guides are in particular arranged offset and staggered in relation to one another, i.e., the surface light guides are arranged next to one another and in steps. The surface light guides can also be adapted to the shape of the light, wherein, for example, the rear light tapers to one side and the geometries of the surface light guides are adapted and scaled accordingly.

The surface light guides can be switched on simultaneously to provide the signaling function, causing the light to light up almost completely. Light animations can otherwise also be provided, for example, by switching the individual surface light guides on or off one after the other from one side to the other or by slowly dimming up or down the luminance, i.e., brightness, of all the surface light guides together.

In an embodiment, the surface light guides can, for example, be connected to one another via a connecting bar, wherein the connecting bar is manufactured in one piece with the surface light guides. This allows the manufacturing costs to be reduced, in particular in the plastic injection molding process, wherein all surface light guides are manufactured in a single manufacturing step. The assembly effort is also simplified by the one-piece nature of the surface light guides and the connecting bar, wherein all the surface light guides are mounted on the support structure of the light in a single assembly step.

A first group of surface light guides connected to one another via a connecting bar and a second group of surface light guides connected to one another via a connecting bar can, for example, be provided, wherein, in each case, a surface light guide of the second group is arranged between two surface light guides of the first group. The first group of surface light guides is produced in one piece by an injection molding process so that the surface light guides of the first group form a first injection molded part with the connecting bar. The second group of surface light guides is also produced in one piece by injection molding so that the surface light guides of the second group form a second injection molded part with the associated connecting bar. When assembling the light of the motor vehicle, the surface light guides of the two groups are inserted into each other so that a surface light guide of the second group is arranged between two surface light guides of the first group. By dividing the surface light guides into several groups, the production of the surface light guides can be simplified because a greater distance exists between two neighboring surface light guides of a group, thus providing more clearance for the demolding direction and/or for sliders.

An additional illuminant can, for example, be provided, which is arranged so that the additional illuminant illuminates the second flat side of the light decoupling section directly or via a reflector element, a light guiding element or another optical system. Due to the remaining transparency of the surface light guides despite the decoupling structure of the light decoupling section, a second signaling function can be provided by the additional light source. In a rear light of the motor vehicle, the second signaling function can, for example, be a brake light, a direction indicator, a rear fog light or a back-up light. In the case of a headlight, the second signaling function can, for example, be a position light, a daytime running light or a direction indicator.

The additional light source can, for example, be arranged on the same printed circuit board as the light source. The light rays emitted by the additional illuminant can be redirected indirectly via the reflector, the light guiding element or another optical system onto the surface light guide. The additional light source can alternatively be arranged behind the surface light guide so that the illumination of the additional light source is recorded directly, i.e., without a reflector.

Various embodiments of the present invention are explained in greater detail below with reference to the drawings.

Figure 1:
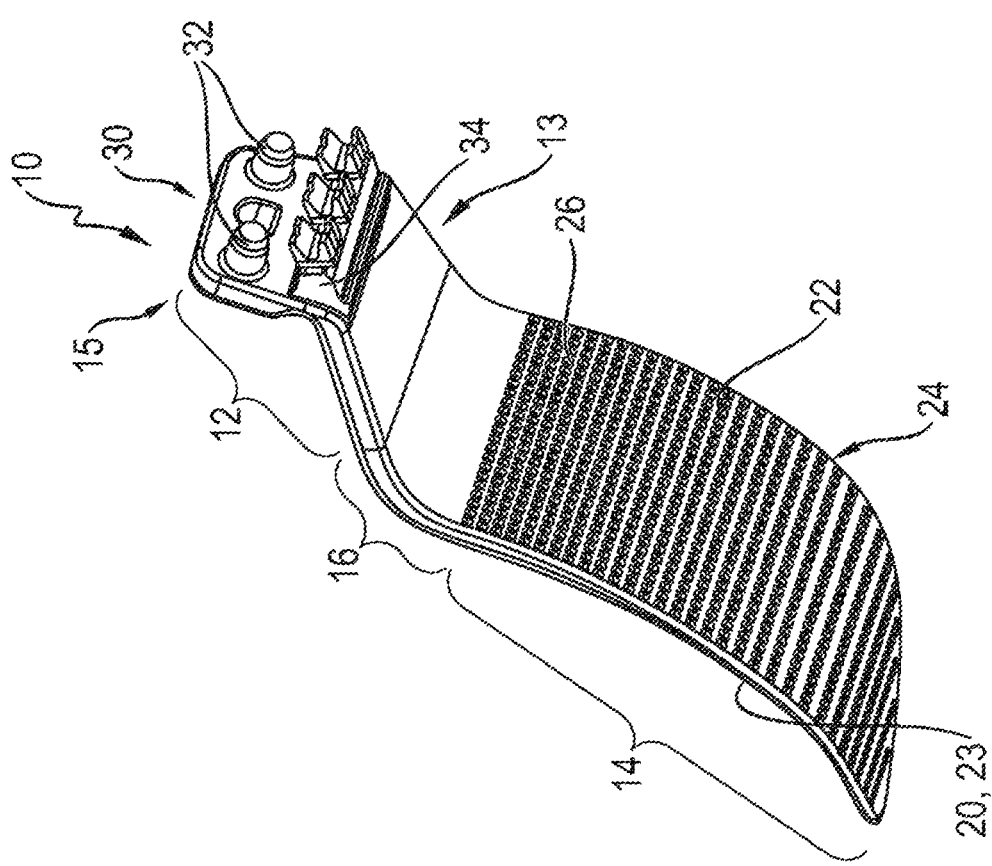
FIG. 1 shows a surface light guide in perspective rear view.

FIGS. 1 and 2 show a one-piece surface light guide 10. The surface light guide 10 is divided into several sections and comprises a light coupling section 12, a light decoupling section 14, and a deflection section 16, wherein the deflection section 16 is arranged between the light coupling section 12 and the light decoupling section 14.

Figure 3:
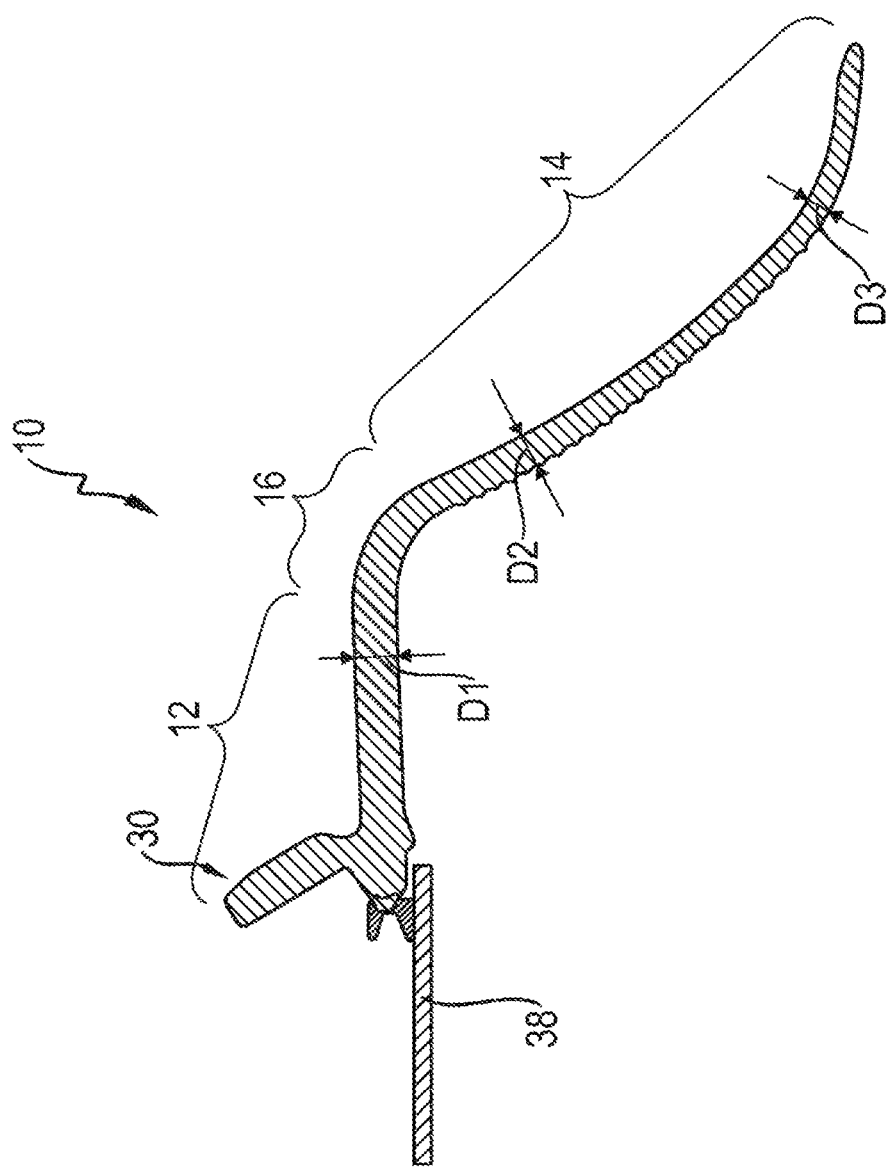
FIG. 3 shows the surface light guide in cross-section.

The light coupling section 12 is in turn divided into two sections 13, 15. Both sections 13, 15 are configured in a plate-like manner and directly adjoin one another, wherein a second section 15 adjoins a first section 13 at an angle at an end facing away from the deflection section 16. The second section 15 comprises a fastening device 30 with two fasteners 32, wherein the surface light guide 10 is mounted on a support exclusively via the fastener 32. The surface light guide 10 is thereby mounted on the support in the form of a cantilever. A coupling surface in the form of a linear lens 34 is arranged at one end of the first section 13 or in a transition between the two sections 13, 15 of the light coupling section 12. The linear lens 34 extends over the entire depth of the light coupling section 12, wherein the linear lens 34 is used to couple light rays from a plurality of illuminants 36, in particular LEDs. The illuminants 36 are arranged directly on a printed circuit board 38, wherein the printed circuit board 38, as shown in FIG. 2, can be orientated transversely or, as shown in FIG. 3, longitudinally to the light rays coupled in by the illuminants 36.

The deflection section 16 directly adjoins an end of the first section 13 of the light coupling section 12 facing away from the second section 15, the deflection section 16 being used as a transition between the light coupling section 12 and the light decoupling section 14 which is arranged at an angle to the light coupling section 12.

The deflection section 16 comprises a light guiding structure 18 on a flat side which is configured in a corrugated manner. The corrugated light guiding structure 18 of the deflection section 16 is configured as a small micro-optic in the form of protrusions 19 extending in a longitudinal direction.

When light rays are coupled in by the illuminants 36, the light coupling section 12, in particular the first section 13 of the light coupling section 12, is used as a lead-in area for the coupled-in light rays. A first light mixing of the light rays coupled in via the illuminants 36 takes place in the pre-coupling area. In the deflection section 16 adjoining the light coupling section 12, a further light mixing or light ray deflection takes place due to the corrugated light guiding structure 18. A uniform generation of scattered light is achieved in the subsequent light decoupling section due to the light mixing 14, and thereby a homogeneous illumination of the light decoupling section 14, even at different viewing angles.

The light decoupling section 14 is configured to be curved, i.e., tongue- or spoon-shaped, and comprises a continuously decreasing wall thickness as shown in FIG. 3. As shown in FIG. 3, the surface light guide 10 comprises a wall thickness D1 at the first section 13 of the light coupling section 12, a wall thickness D2 at an upper region of the light decoupling section 14 and a wall thickness D3 at a lower region of the light decoupling section 14, wherein the wall thickness D3 of the lower region is smaller than the wall thickness D2 of the upper region of the light decoupling section 14. The wall thickness D1 of the light coupling section 12 is greater than the wall thickness D2 of the upper area of the light decoupling section 14 so that the wall thickness of the surface light guide 10 decreases steadily from the end of the light coupling section 12 facing away from the light decoupling section 14 to the free end of the light decoupling section 14.

The light decoupling section 14 comprises a first flat side 20 and a second flat side 22. The first flat side 20 represents a light decoupling surface 23 through which the light rays coupled into the surface light guide 10 are again decoupled. A decoupling structure 24 is arranged on the second flat side 22 which is used to deflect the light rays coupled into the light coupling section 12 and forwarded via the deflection section 16 in the direction of the light decoupling surface 23.

Figure 4:
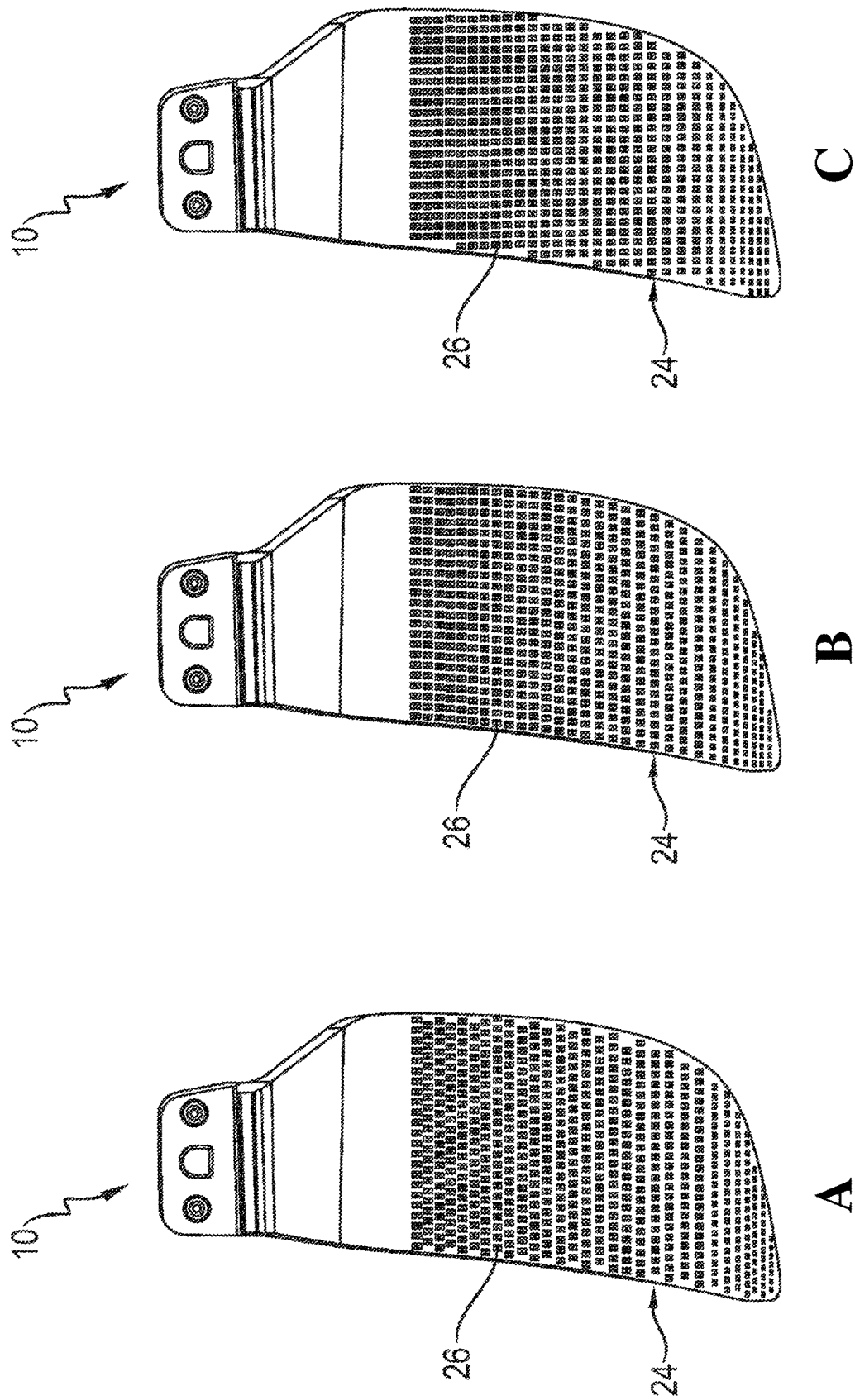
FIG. 4 shows three arrangements (A, B and C) of the surface light guide with a decoupling structure arranged in a light decoupling section.
Figure 5:
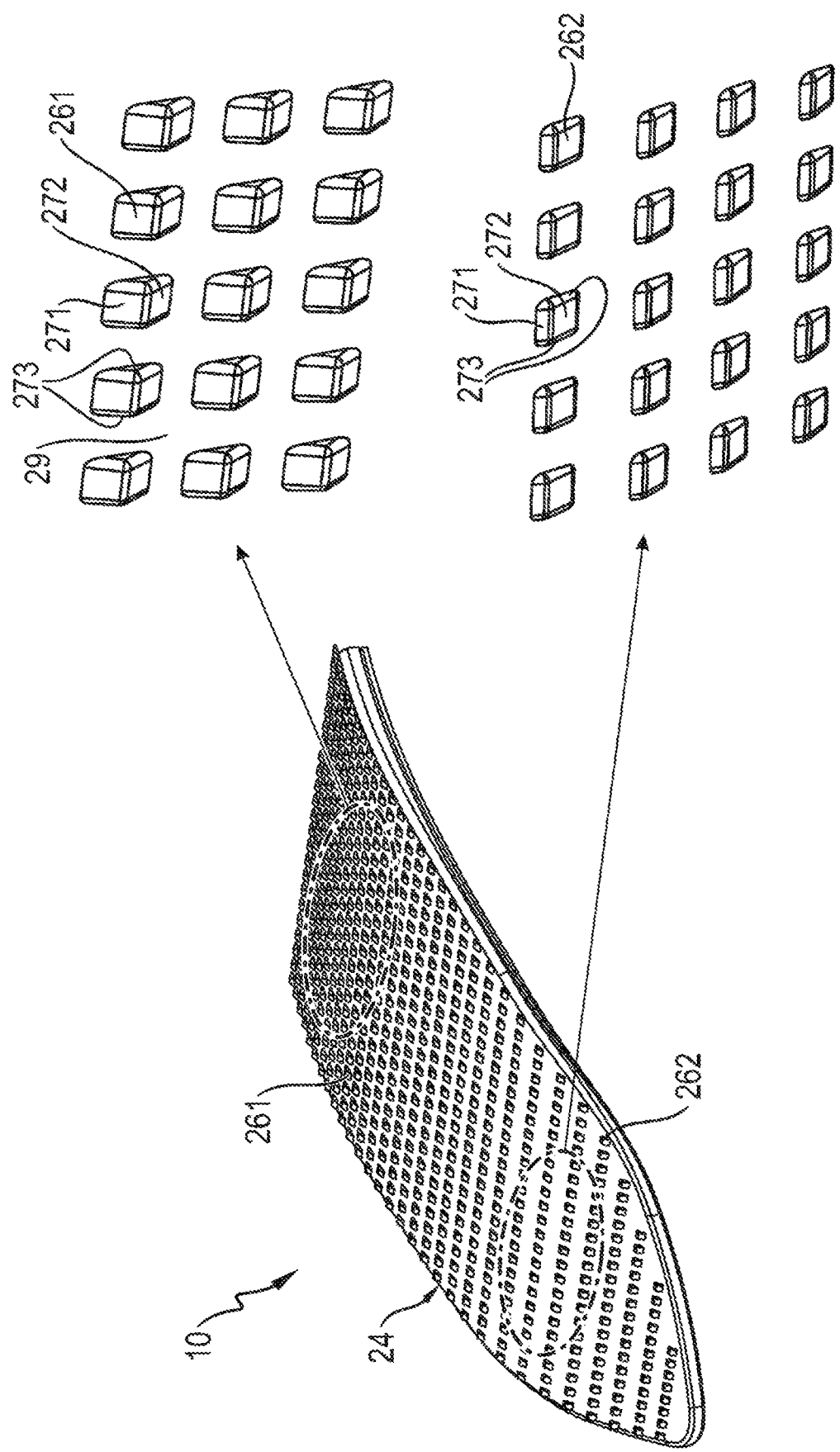
FIG. 5 shows a section of the light decoupling section with the decoupling structure.

The decoupling structure 24, which is also shown in A-C of FIG. 4 and FIG. 5, comprises a plurality of light decoupling elements 26 which are configured as micro-optics, i.e., with a length of 0.4 to 0.6 mm, and are arranged spaced apart from one another in two spatial directions. The light decoupling elements 26 comprise a plurality of planar surfaces 271, 272 and two side surfaces 273, wherein the planar surfaces 271, 272 and the side surfaces 273 are arranged so that the planar surfaces 271, 272 and the side surfaces 273 form a pocket. Planar areas 29 remain between the individual light decoupling elements 26. The light decoupling elements 26 are used to deflect the light rays in the direction of the light decoupling surface 23. The planar areas 29 are used to transmit the light rays within the light decoupling section 14.

As shown in A-C of FIG. 4, the light decoupling elements 26 are arranged in a grid-like manner, wherein, A of FIG. 4 shows that each row of the light decoupling elements 26 is arranged offset from the two neighboring rows, wherein the light decoupling elements 26 are arranged in the area of the planer areas 29 of the neighboring rows. B of FIG. 4 shows that each row is completely filled in between the two edges. C of FIG. 4 shows a further grid-like arrangement of the light decoupling elements 26, wherein the light decoupling elements 26 are arranged offset from one another in blocks.

FIG. 5 shows that the geometry of the light decoupling elements 26 in the path of the surface light guide 10 is adapted in sections, i.e., line by line, to the geometry of the surface light guide 10, i.e., to the curvature path, and the inner light path. The light decoupling elements 261 here arranged in a first, essentially straight section, comprise a first shape, and the light decoupling elements 262 here arranged in a second, curved section, comprise a second shape which deviate from the shape of the light decoupling elements 261 in the first section, wherein the angle of the planar surfaces 271, 272 and the size of the planar areas 29 between the light decoupling elements 261, 262 is in particular changed. In other words, the light decoupling elements 262 are configured to be flatter than the light decoupling elements 261, and the planar areas 29 between the light decoupling elements 262 are larger than the planar areas 29 between the light decoupling elements 261.

All measures, in particular the light guide structure 18, the reduction in wall thickness of the light decoupling section 14, and the design of the light decoupling elements 26, are used to achieve a homogeneous illumination of the surface light guide 10.

Figure 6:
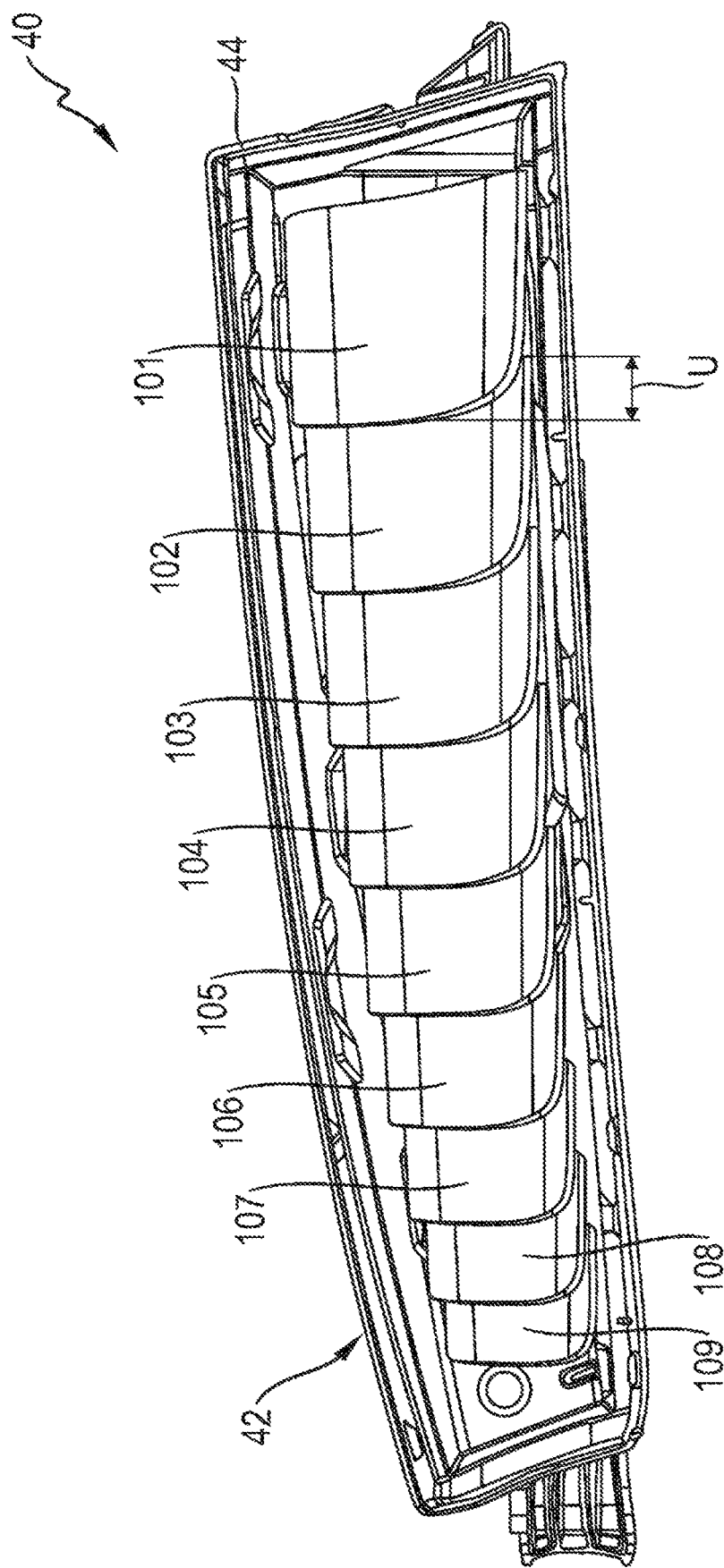
FIG. 6 shows a light of a motor vehicle in a frontal view.
Figure 7:
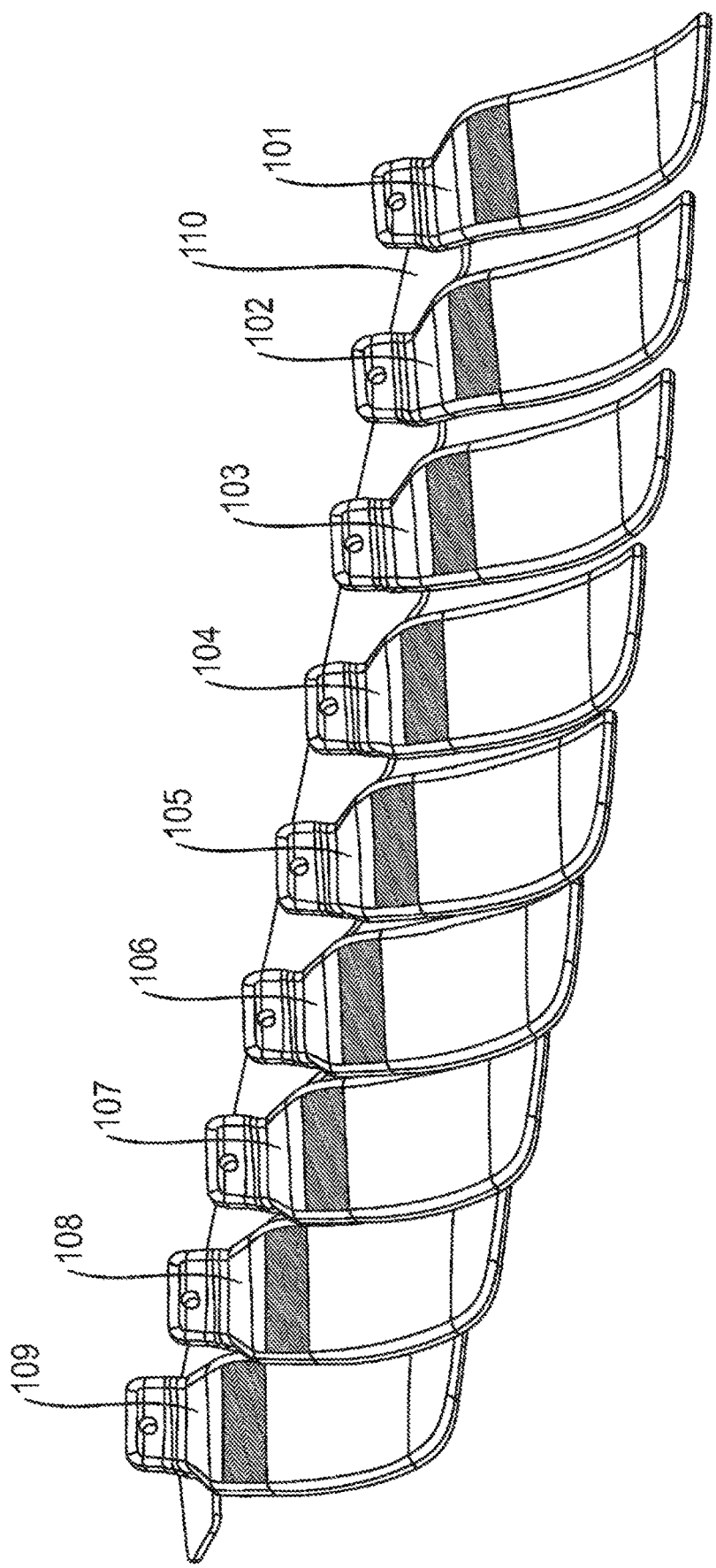
FIG. 7 shows a one-piece surface light guide arrangement with several surface light guides.
Figure 8:
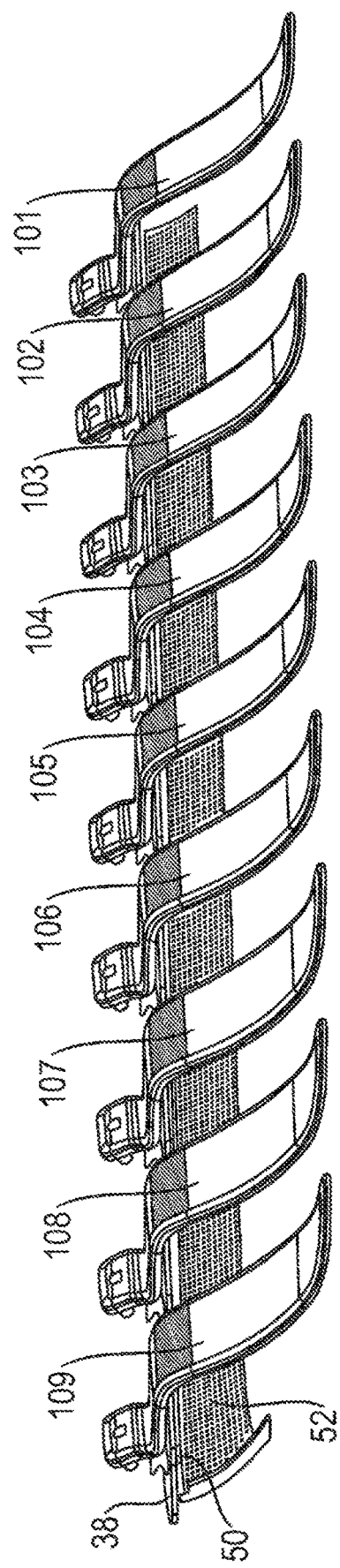
FIG. 8 shows an area light guide arrangement and a version with an additional illuminant of the light from FIG. 6.

FIGS. 6, 7 and 8 show the use of the surface light guide 10 from FIGS. 1 to 5 in a light 40 of a motor vehicle, wherein the light 40 can be a front headlight or a rear light.

The light 40 comprises a support element 44 which defines a cavity 42. Nine surface light guides 101, 102, 103, 104, 105, 106, 107, 108, 109, each comprising one or more illuminants 36, are arranged in the cavity 42, wherein the surface light guides 101, 102, 103, 104, 105, 106, 107, 108, 109 are each attached to the support element 44 via two fasteners 32 and adjoin a printed circuit board 38 comprising the illuminants 36. The surface light guides 101, 102, 103, 104, 105, 106, 107, 108, 109 are arranged in a fan-like manner, i.e., overlapping at the edges by the amount U, and are also configured in a scaled manner from one side to an opposite side, wherein the size of the surface light guides 101, 102, 103, 104, 105, 106, 107, 108, 109 continuously decreases.

The surface light guides 101, 102, 103, 104, 105, 106, 107, 108, 109 can be configured separately and manufactured individually via a plastic injection molding process. As shown in FIG. 7, all surface light guides 101, 102, 103, 104, 105, 106, 107, 108, 109 can, for example, be manufactured together with a connecting bar 110 in a plastic injection molding process and mounted together on the support element 44, thereby reducing the manufacturing and the assembly effort. The surface light guides 101, 102, 103, 104, 105, 106, 107, 108, 109 can alternatively be divided into a first group of surface light guides 101, 103, 105, 107, 109 and a second group of surface light guides 102, 104, 106, 108, wherein both groups are connected to each other via a connecting bar 110. The surface light guides 101, 102, 103, 104, 105, 106, 107, 108, 109 of the respective group are manufactured in one piece together with the corresponding connecting bar 110 via plastic injection molding process. When assembling the light 40 of the motor vehicle, the surface light guides 101, 102, 103, 104, 105, 106, 107, 108, 109 of the two groups are inserted into each other so that a surface light guide 102, 104, 106, 108 of the second group is arranged between two surface light guides 101, 103, 105, 107, 109 of the first group.

The light 40 can also include a further signaling function. For this purpose, as shown in FIG. 8, an additional illuminant 50 is provided on each of the printed circuit boards 38 and a reflector 52 is arranged on the second flat side 22 of the light decoupling section 14, wherein the light rays emitted by the additional illuminant 50 strike the reflector 52 and are deflected in the direction of the surface light guides 101, 102, 103, 104, 105, 106, 107, 108, 109. Due to the transparency of the surface light guides 101, 102, 103, 104, 105, 106, 107, 108, 109, the second signaling function can be perceived by a person looking at the light 40.

The present invention is not limited to embodiments described herein; reference should be had to the appended claims.

LIST OF REFERENCE CHARACTERS

10 Surface light guide
12 Light coupling section
13 First section (of light coupling section)
14 Light decoupling section
15 Second section (of light coupling section)
16 Deflection section
18 Light guiding structure
19 Protrusions
20 First flat side
22 Second flat side
23 Light decoupling surface
24 Decoupling structure
26 Light decoupling elements
29 Planer areas
30 Fastening device
32 Fastener
34 Linear lens
36 Illuminants
38 Printed circuit board
40 Light
42 Cavity
44 Support element
50 Additional illuminant
52 Reflector
101 Surface light guide
102 Surface light guide
103 Surface light guide
104 Surface light guide
105 Surface light guide
106 Surface light guide
107 Surface light guide
108 Surface light guide
109 Surface light guide
110 Connecting bar
261 Light decoupling elements
262 Light decoupling elements
271 Planar surface
272 Planar surface
273 Side surface
D1 Wall thickness at the first section 13
D2 Wall thickness at an upper region of the light decoupling section 14
D3 Wall thickness at a lower region of the light decoupling section 14
U Overlap amount

The invention claimed is:

1. A surface light guide for a light of a motor vehicle, the surface light guide comprising:
a light decoupling section which comprises,
a first flat side,
a second flat side which is arranged opposite to the first flat side,
a light decoupling surface which is arranged on the first flat side, and
a decoupling structure which is arranged on the first flat side or on the second flat side, the decoupling structure comprising a plurality of individual and spaced-apart light decoupling elements, the decoupling structure being configured so that light rays which are coupled in by an illuminant are deflected in the light decoupling section so that deflected light rays are emitted through the light decoupling surface;

a light coupling section which is configured to couple in light rays from the illuminant and to mix the coupled-in light rays; and a deflection section, wherein, the light coupling section is directly or indirectly connected to the light decoupling section, the light decoupling section is arranged at an angle to the light coupling section, and the deflection section is arranged between the light decoupling section and the light coupling section.

2. The surface light guide as recited in claim 1, wherein the plurality of individual and spaced-apart light decoupling elements are arranged at a distance from one another in two spatial directions.

3. The surface light guide as recited in claim 1, wherein the plurality of individual and spaced-apart light decoupling elements are arranged in a grid pattern.

4. The surface light guide as recited in claim 1, wherein the plurality of individual and spaced-apart light decoupling elements each comprise a maximum length of 1 mm.

5. The surface light guide as recited in claim 1, wherein each of the plurality of individual and spaced-apart light decoupling elements comprises a plurality of planar surfaces which form a pocket.

6. The surface light guide as recited in claim 1, wherein the plurality of individual and spaced-apart light decoupling elements are arranged to have a concave surface or a convex surface.

7. The surface light guide as recited in claim 1, wherein,
the light decoupling section further comprises at least a first section and a second section,
the first section comprises a plurality of first light decoupling elements, and
the second section comprises a plurality of second light decoupling elements which differ from the first light decoupling elements.

8. The surface light guide as recited in claim 1, wherein,
the deflection section comprises a light guiding structure on at least one of the first flat side and the second flat side, and
the light guiding structure comprises a plurality of protrusions which extend in a longitudinal direction.

9. The surface light guide as recited in claim 1, wherein the light decoupling section has a curved profile.

10. The surface light guide as recited in claim 1, wherein,
the light decoupling section further comprises a side which faces the light coupling section, a free end, and a wall thickness between the first flat side and the second flat side, and
the wall thickness of the light decoupling section reduces starting from the side which faces the light coupling section up to the free end.

11. The surface light guide as recited in claim 1, further comprising:
a fastener which is configured to attach the surface light guide to a support structure, the fastener being arranged on a side of the light coupling section which faces away from the light decoupling section.

12. The surface light guide as recited in claim 1, further comprising:
a coupling surface for coupling in light rays of the illuminant; and
a linear lens which is arranged on the coupling surface,
wherein,
the light coupling section comprises an end face which faces away from the light decoupling section, and
the coupling surface is arranged on the end face of the light coupling section.

13. For a motor vehicle, the light comprising:
a support structure;
at least one surface light guide as recited in claim 1, the at least one surface light guide being attached to the support structure; and
at least one illuminant through which light rays can be coupled into the at least one surface light guide.

14. The light as recited in claim 13, further comprising:
at least two of the at least one surface light guide,
wherein,
the at least two of the at least one surface light guide are arranged next to one another.

15. The light as recited in claim 14, wherein,
each of the at least two of the at least one surface light guide has edge regions, and
the edge regions of the at least two of the at least one surface light guide which neighbor each other overlap.

16. The light as recited in claim 14, further comprising:
a connecting bar which is configured to connect the at least two of the at least one surface light guide with each other,
wherein,
the connecting bar is produced in one piece with the at least two of the at least one surface light guide.

17. The light as recited in claim 14, wherein,
a first group of the at least two of the at least one surface light guide is connected to one another via a connecting bar,
a second group of the at least two of the at least one surface light guide is connected to one another via the connecting bar, and
one respective surface light guide of the second group is always arranged between two surface light guides of the first group.

18. The light as recited in claim 13, further comprising:
an additional illuminant which is arranged to illuminate the second flat side of the light decoupling section either directly or indirectly via a reflector element, a light guiding element or another optical system.

* * * * *